(12) United States Patent
Laur et al.

(10) Patent No.: US 10,345,107 B2
(45) Date of Patent: Jul. 9, 2019

(54) AUTOMATED VEHICLE SENSOR SELECTION BASED ON MAP DATA DENSITY AND NAVIGATION FEATURE DENSITY

(71) Applicant: Aptiv Technologies Limited, St. Michael (BB)

(72) Inventors: Michael H. Laur, Mission Viejo, CA (US); John P. Absmeier, Capitola, CA (US)

(73) Assignee: APTIV TECHNOLOGIES LIMITED (BB)

( * ) Notice: Subject to any disclaimer, the term of this patent is extended or adjusted under 35 U.S.C. 154(b) by 401 days.

(21) Appl. No.: 15/189,389

(22) Filed: Jun. 22, 2016

(65) Prior Publication Data

US 2017/0370729 A1 Dec. 28, 2017

(51) Int. Cl.
*G01S 13/94* (2006.01)
*G01C 21/30* (2006.01)
*G06F 16/29* (2019.01)

(52) U.S. Cl.
CPC ............. *G01C 21/30* (2013.01); *G06F 16/29* (2019.01)

(58) Field of Classification Search
CPC . G01C 21/30; G01C 21/005; G06F 17/30241; G08G 5/0086; G01S 13/94
See application file for complete search history.

(56) References Cited

U.S. PATENT DOCUMENTS 9,778,661 B2 * 10/2017 Wang .................... G05D 1/101
2017/0074659 A1 * 3/2017 Giurgiu .................. G01S 19/41
2018/0209796 A1 * 7/2018 Kudrynski ............. G01C 21/28

OTHER PUBLICATIONS

U.S. Appl. No. 62/218,538, filed Sep. 14, 2015, Kudrynski,Krzysztof.*

* cited by examiner

*Primary Examiner* — Adam D Tissot
*Assistant Examiner* — Aaron C Smith
(74) *Attorney, Agent, or Firm* — Lawrence D. Hazelton

(57) ABSTRACT

A navigation system suitable for use by an automated vehicle includes a first sensor, a second sensor, a digital-map, and a controller. The digital-map includes a first data-group of navigation-features preferentially detected by the first sensor-technology, and a second data-group of navigation-features preferentially detected by the second sensor-technology. The controller determines, on the digital-map, first and second locations of the host-vehicle using the first and second sensors, respectively. The controller selects one of the first and second locations to navigate the host-vehicle based on a comparison of the first data-density and the second data-density. Alternatively, the controller determines a first feature-density and a second feature-density of navigation-features detected by the first and second sensors respectively, and selects one of the first location and the second location to navigate the host-vehicle based on a comparison of the first feature-density and the second feature-density.

7 Claims, 2 Drawing Sheets

AUTOMATED VEHICLE SENSOR SELECTION BASED ON MAP DATA DENSITY AND NAVIGATION FEATURE DENSITY

TECHNICAL FIELD OF INVENTION

This disclosure generally relates to navigating an automated vehicle, and more particularly relates to selecting which of multiple sensors is used to navigate the automated vehicle, where the selection is based on data-density on a digital-map and/or feature-density of navigation-features detected by the sensors.

BACKGROUND OF INVENTION

It is known to navigate, control, or otherwise operate an automated vehicle (host-vehicle) using various sensors, e.g. camera, radar, lidar. It is also been suggested to use such sensors to determine a location of the host-vehicle on a digital map. However, each of the various sensor-technologies has advantages and disadvantages for detecting various types of navigation-features, so uncertainty can arise if locations on the digital-map determined by different sensors do not coincide with each other, and/or may not coincide with a location determined using a global-positioning-system (GPS).

SUMMARY OF THE INVENTION

In accordance with one embodiment, a digital-map usable to navigate an automated vehicle is provided. The digital-map includes a first data-group composed of navigation-features characterized as preferentially detected by a first sensor-technology, and a second data-group composed of navigation-features characterized as preferentially detected by a second sensor-technology different from the first sensor-technology.

In another embodiment, a navigation system suitable for use by an automated vehicle is provided. The system includes a first sensor, a second sensor, a digital-map, and a controller. The first sensor is used to determine a first relative-position of a first navigation-feature relative to a host-vehicle, said first sensor characterized as based on a first sensor-technology. The second sensor is used to determine a second relative-position of a second navigation-feature relative to the host-vehicle, said second sensor characterized as based on a second sensor-technology different from the first sensor-technology. The digital-map includes a first data-group composed of navigation-features characterized as preferentially detected by the first sensor-technology, and a second data-group composed of navigation-features characterized as preferentially detected by the second sensor-technology. The controller is in communication with the first sensor, the second sensor, and the digital-map. The controller is configured to determine a first location of the host-vehicle on the digital-map based on the first relative-position of the first navigation-feature indicated by the first sensor. The first data-group of the digital-map proximate to the first location is characterized by a first data-density. The controller is further configured to determine a second location of the host-vehicle on the digital-map based on the second relative-position of the second navigation-feature indicated by the second sensor. The second data-group on the digital-map proximate to the second location is characterized by a second data-density. The controller is further configured to select one of the first location and the second location for use to navigate the host-vehicle based on a comparison of the first data-density and the second data-density.

In yet another embodiment, a navigation system suitable for use by an automated vehicle is provided. The system includes a first sensor, a second sensor, a digital-map, and a controller. The first sensor is used to determine a first relative-position of a first navigation-feature relative to a host-vehicle, said first sensor characterized as based on a first sensor-technology. The second sensor is used to determine a second relative-position of a second navigation-feature relative to the host-vehicle, said second sensor characterized as based on a second sensor-technology different from the first sensor-technology. The digital-map includes a first data-group composed of navigation-features characterized as preferentially detected by the first sensor-technology, and a second data-group composed of navigation-features characterized as preferentially detected by the second sensor-technology. The controller is in communication with the first sensor, the second sensor, and the digital-map. The controller is configured to determine a first location of the host-vehicle on the digital-map based on the first relative-position of the first navigation-feature indicated by the first sensor and determine a first feature-density of navigation-features detected by the first sensor. The controller is further configured to determine a second location of the host-vehicle on the digital-map based on the second relative-position of the second navigation-feature indicated by the second sensor and determine a second feature-density of navigation-features detected by the second sensor. The controller is further configured to select one of the first location and the second location for use to navigate the host-vehicle based on a comparison of the first feature-density and the second feature-density.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
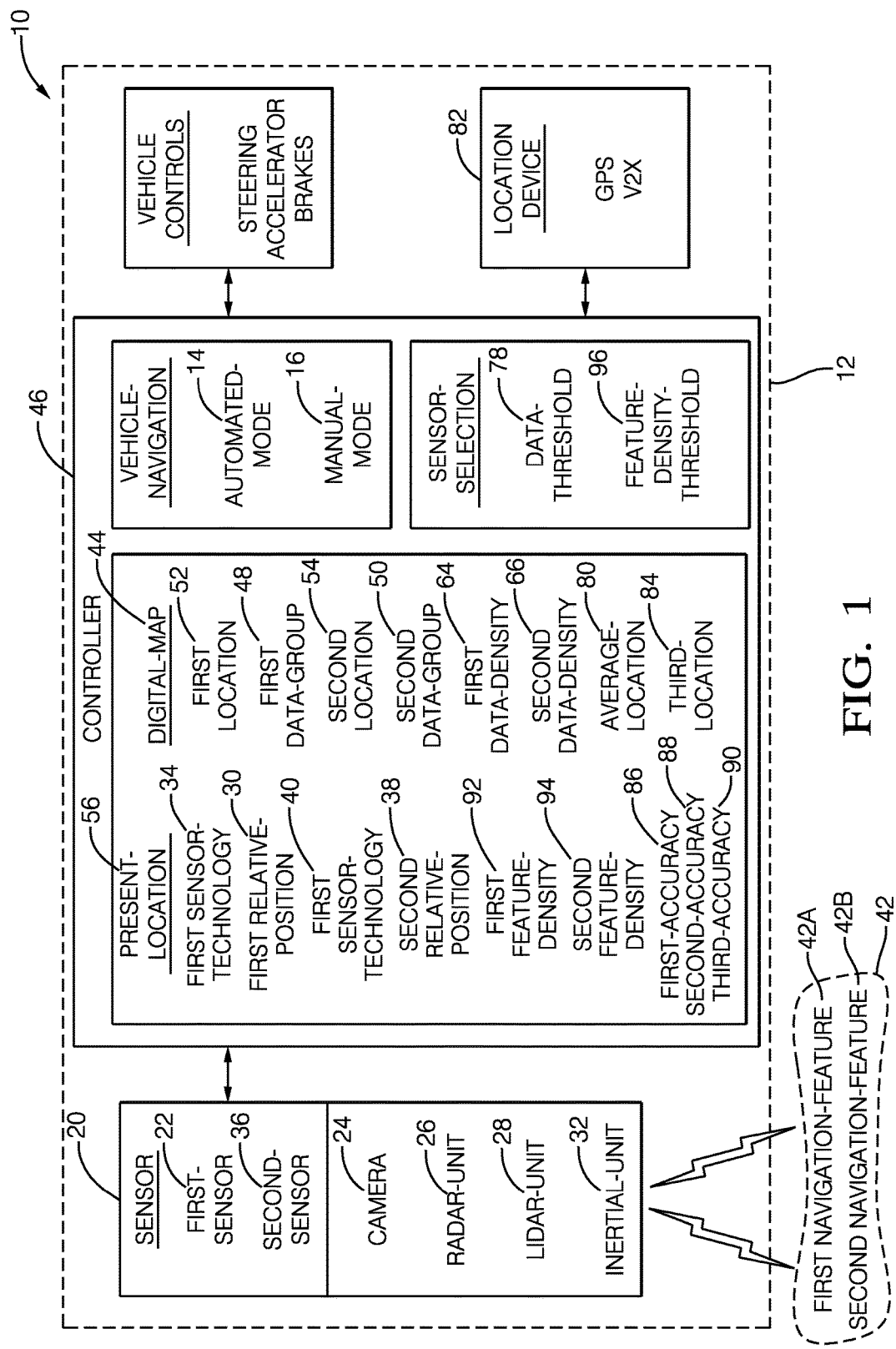
FIG. 1 is a diagram of a navigation system in accordance with one embodiment.

FIG. 1 illustrates a non-limiting example of a navigation system 10, hereafter referred to as the system 10, which is suitable for use by an automated vehicle, for example a host-vehicle 12. The examples presented herein are generally directed to instances when the host-vehicle 12 is being operated in an automated-mode 14, i.e. a fully autonomous mode, where a human operator (not shown) of the host-vehicle 12 does little more than designate a destination to operate the host-vehicle 12. However, it is contemplated that the teachings presented herein are useful when the host-vehicle 12 is operated in a manual-mode 16 where the degree or level of automation may be little more than providing steering advice to the human operator who is generally in control of the steering, accelerator, and brakes of the host-vehicle 12, i.e. the system 10 assists the human operator as needed to reach the destination and/or avoid a collision. It is also contemplated that the automated vehicle can operate without a human operator.

The system 10 includes a plurality of sensors 20 that includes a first sensor 22, which by way of example and not limitation may a camera 24, a radar-unit 26, or a lidar-unit 28. The first sensor 22 is generally used to determine a first relative-position 30 of a first navigation-feature 42A relative to a host-vehicle 12, for example, to determine distance or range and a direction or bearing to the first navigation-feature 42A. The first navigation-feature 42A maybe any object detectable by the first sensor 22 that may be helpful to navigate the host-vehicle 12. For example, the first navigation-feature 42A may be a sign, traffic-signal, roadway-marking, barricade, building, or any other permanent or semi-permanent feature that can be used to determine the position of the host-vehicle 12 on the roadway 18 (FIG. 2) that the host-vehicle 12 presently travels.

The plurality of sensors 20 may also include an inertial-unit 32 that is part of an inertial navigation system (INS) that tracks relative motion of the host-vehicle 12. The INS may be used in combination with a global-positioning-system (GPS) to track or localize the host-vehicle 12 on a digital-map. As used herein, the term 'navigation feature' is sometimes alternatively referred to as 'localization feature' because the navigation features are used for localization of the host-vehicle on a digital map. That is, localization-feature' could replace 'navigation-feature' often throughout this document.

It is noted that the first sensor 22 is not limited to only detecting the first navigation-feature 42A as the first sensor 22 may be used by other systems in the vehicle such as a collision avoidance system. The first sensor 22 is generally characterized as being based on a first sensor-technology 34. For example, if the first sensor 22 is the camera 24, then well-known imaging technology such as lenses and image detectors may be used. If the first sensor 22 is the radar-unit 26, then well-known radar antenna and radar transceiver technology may be used.

The system 10, or more specifically the plurality of sensors 20, also includes a second sensor 36 used to determine a second relative-position 38 of a second navigation-feature 42B relative to the host-vehicle 12. The second sensor 36 is characterized as being based on a second sensor-technology 40 different from the first sensor-technology 34 used by the first sensor 22. This is not meant to suggest that every sensor on the host-vehicle 12 must be based on a different sensor-technology. That the first sensor-technology 34 is specified as different from the second sensor-technology 40 in this example is only to illustrate the benefit of the system 10 having at least two different sensor-technologies available to detect various instances of navigation-features 42. It was recognized that some misalignment may exist between different sensors that use different sensor-technologies. That is, when the first sensor 22 and the second sensor 36 both detect the same instance of the navigation-features 42; the first relative-position 30 and the second relative-position 38 may not precisely match. The improvement is that the system 10 determines when navigation guidance is better or more reliably provided by the first sensor-technology 34, so the first navigation-feature 42A detected by the first sensor 22 should be given more weight or credibility than navigation guidance provided by the second sensor-technology 40, or when the reverse is the case, as will be explained in more detail below. That is, the system 10 may select either the first relative-position 30 or the second-relative position 38 as preferable to navigate the host-vehicle 12.

The system 10 also includes a digital-map 44 usable to navigate an automated vehicle, e.g. the host-vehicle 12. While FIG. 1 suggests that the digital-map 44 is built into or integrated into a controller 46 of the system 10, it is contemplated that the digital-map 44 could be located 'in the cloud' and accessible via a number of known communication methods. The digital-map 44 includes or comprises a first data-group 48 composed of navigation-features 42 characterized as preferentially detected by the first sensor-technology 34, and a second data-group 50 composed of navigation-features 42 characterized as preferentially detected by the second sensor-technology 40 which is advantageously different from the first sensor-technology 34. As used herein, preferentially detected by a particular sensor-technology means that an instance of the navigation-features 42 is more easily or more readily detected by one sensor-technology when compared to the other sensor-technology.

For example, if the first sensor 22 is the camera 24 and the second sensor 36 is the radar-unit 26, the first data-group 48 would be advantageously composed of the navigation-features 42 that are more easily detected by the camera 24 as compared to the radar-unit 26, e.g. a roadway-marking 62 (FIG. 1), so the first relative-position 30 is more readily determined by the first sensor 22. Similarly, if the second sensor 36 is the radar-unit 26, the second data-group 50 would be advantageously composed of the navigation-features 42 that are more easily detected by the radar-unit 26, e.g. a stop-sign 60 for example. While is it recognized that the camera 24 can readily detect the stop-sign 60, it is noted that the radar-unit can more readily determine the range and direction (i.e. the second relative-position 38) of the stop-sign 60 when compared to the ability of the camera 24 to determine range and direction.

While the non-limiting example of the digital-map 44 described herein suggests that all of the navigation-features 42 are collected to form a unified version of the digital-map 44, it is contemplated that there could be multiple instances of digital-maps where each instance may identify or include navigation-features that are more readily detected by a particular type of sensor. For example, one map supplier may provide a digital-map that is optimized for use when the camera 24 is used as a sensor, and another map supply may provide a second digital-map that is optimized for use when the radar-unit 26 is being used as a sensor. It is envisioned that the various maps would be dimensioned in such a way so various digital-maps could be aligned, i.e. conceptually overlaid, to effectively form a single unified digital-map. For example, all versions of various digital-maps are referenced to the same world-coordinates, e.g. latitude, longitude, and elevation.

With the controller 46 in communication with the first sensor 22, the second sensor 36, and the digital-map 44, the controller 46 may be configured to determine a first location 52 of the host-vehicle 12 on the digital-map 44 based on the first relative-position 30 of the first navigation-feature 42A detected or indicated by the first sensor 22, and determine a second location 54 of the host-vehicle 12 on the digital-map 44 based on the second relative-position 38 of the second navigation-feature 42B detected or indicated by the second sensor 36. Because of the aforementioned possible misalignment of the first-sensor 22 relative to the second-sensor 36, and/or possible misalignment/location-error of the navigation-features 42 indicated on various digital-maps, the first location 52 and the second location 54 may not precisely match or coincide. As such, a way or method to determine an advantage of using either the first location 52 or the second location 54 to determine a present-location 56 on the digital-map 44 is desired.

In one embodiment of the digital-map 44, the first data-group 48 is characterized by a first data-density 64 proximate to the present-location 56 on the digital-map 44, and the second data-group 50 is characterized by a second data-density 66 proximate to the present-location 56 on the digital-map 44. That is, the first data-group 48 of the digital-map 44 proximate to the first location 52 may be characterized by the first data-density 64, and the second data-group 50 on the digital-map 44 proximate to the second location 54 may be characterized by the second data-density 66. As used herein, the first data-density 64 and the second data-density 66 are an indication of how many instances of the navigation-features 42 are close enough to the present-location 56 (i.e. the first location 52 or the second location 54) to be detectable by the sensors 20 of the system 10. For example, in an urban environment, the data-densities may be indicated by how many of the navigation-features 42 are present on the digital-map 44 that are within one-hundred meters (100 m) of the present-location 56, while in a rural environment the data-densities may be indicated by how many of the navigation-features 42 are present on the digital-map 44 that are within one-thousand meters (1000 m) of the present-location 56.

Figure 2:
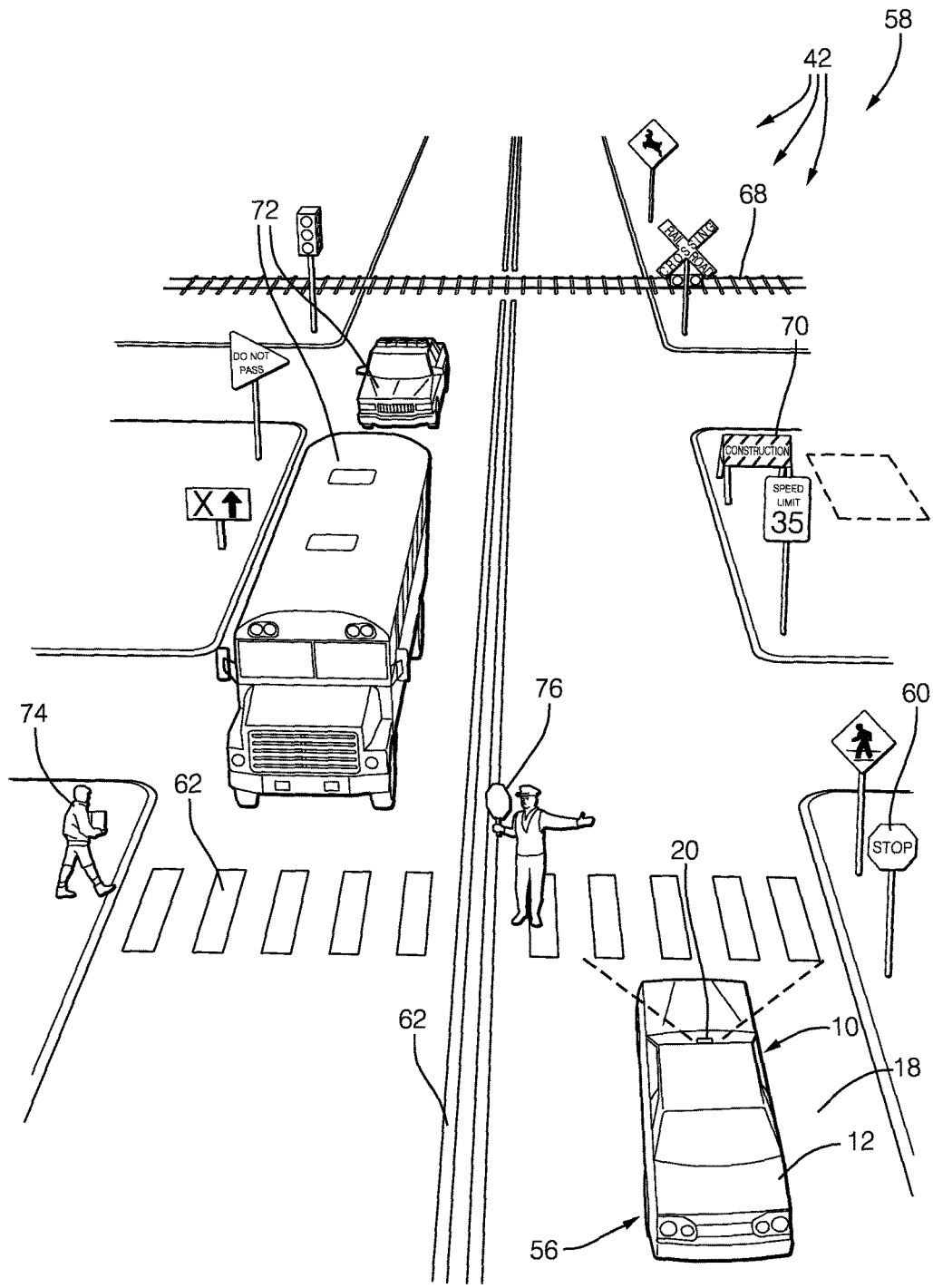
FIG. 2 is a traffic-scenario encountered by the system of FIG. 1 in accordance with one embodiment.

FIG. 2 illustrates a non-limiting example of a traffic-scenario 58 that may be encountered by the host-vehicle 12. It is contemplated that many of the permanent features such as the stop-sign 60, the roadway-marking 62, and the railroad-tracks 68 would be some of the navigation-features 42 present in the digital-map 44. By way of further example and not limitation, the stop-sign 60 may be readily detected by both the camera 24 and the radar-unit 26 because the image of the stop-sign 60 is easily determined using available image processing algorithms, and the metal that forms the stop-sign 60 provides for a relatively strong radar signal return. It is also noted that the stop-sign 60 would be readily detected by the lidar-unit 28. However, the roadway-marking 62 is likely more readily detected by the camera 24 than by the radar-unit 26 for reasons that will be recognized by those in the art. In contrast, the railroad-tracks 68 may not provide a strong visual contrast to the surface of the roadway 18 so would not be as readily detected by the camera 24 as they would be by the radar-unit 26 because the metal rails would provide a substantial radar signal return.

Instances of temporary objects such as the other-vehicles 72 and the pedestrian 74 about to cross the roadway 18 would not be on the digital-map 44, so would not be used to determine the present-location 56 of the host-vehicle 12. That is, if such temporary objects are detected, they would be ignored by the system 10 for the purpose of navigation of the host-vehicle 12, but not necessarily ignored by other aspects of control of the host-vehicle 12 such as collision-avoidance. While the specific location of the crossing-guard 76 who is present at only on certain days of the week and certain times of day would not be suitable for use as a navigation-feature, a presence-schedule of the crossing-guard 76 may be included in the digital-map 44 so heightened detection methods may be used by the system 10 when the presence of the crossing-guard 76 is expected. It is also contemplated that semi-permanent objects such as the construction-sign 70 could be added and removed from the digital-map 44 by a government agency or by cooperative detection and classification by the host-vehicle 12 the other-vehicles 72.

In one embodiment of the system 10 the digital-map 44 may be configured to be usable to select a preferred sensor-technology to be used to detect the navigation-features 42 at the present-location 56 based on a comparison of the first data-density 64 to the second data-density 66 of the digital-map 44 proximate to the present-location 56. That is, a comparison of the density of navigation-features present in the digital-map 44 proximate to the present-location 56 may be used to determine which of the first data-group 48 or the second data-group 50 is used, i.e. whether the first sensor 22 or the second sensor 36 is used or primarily used to navigate the host-vehicle 12. By way of a non-limiting example, in FIG. 2 there are numerous instances of permanent signs in addition to the stop-sign 60 so the second data-density 66 may be greater than the first data-density 64 which may include only the roadway-marking 62. For this example, the preferred sensor-technology may be radar, so the second sensor 36 (the radar-unit 26) is used as the primary means to determine the present-location 56 on the digital-map 44.

In the example above, the first navigation-feature 42A is associated with a first object (the roadway-marking 62) and the second navigation-feature 42B is associated with a second object (the stop-sign 60) which is different from the first object. However, it is recognized that the first navigation-feature 42A and the second navigation-feature 42B may be associated with the same object, e.g. the camera 24 and the radar-unit 26 can both readily detect the stop-sign 60, but the radar-unit 26 may be able to more readily detect more distant instance of signs such as the rail-road crossing sign. Nevertheless, it follows that the host-vehicle 12 is advantageously navigated in accordance with the first location 52 (which is determined based on the first navigation-feature 42A) when the first data-density 64 is greater than the second data-density 66, and the host-vehicle 12 is operated in accordance with the second location 54 (which is determined based on the first navigation-feature 42A) when the first data-density 64 is not greater than the second data-density 66.

It is recognized that in urban environments the data-densities of the navigation-features 42 may be relatively high as compared to rural environments. An advantage of selecting which of the sensors 20 is used or primarily used to determine the present-location 56 is that the track of the host-vehicle 12 is less likely to dither due to misalignment errors between the first-sensor 22 and the second-sensor 36 and/or map-data inconsistencies. However, it is also recognized that in rural environments the density of the navigation-features 42 may be so sparse, i.e. below a data-threshold 78 (FIG. 1), that in an alternative embodiment of the system 10 the controller 46 may be advantageously further configured to determine an average-location 80 based on a combination or averaging of the first location 52 and the second location 54, and navigate the host-vehicle 12 in accordance with the average-location 80 when the first data-density 64 and the second data-density 66 are both less than the data-threshold 78.

Optionally, in addition to the first-sensor 22 and the second-sensor 36, the system 10 may include a location-device 82 used to determine a third location of the host-vehicle 12 on the digital-map 44. The location-device 82 may be a global-position-sensor (GPS) and/or a transceiver (not shown) configured for vehicle-to-infrastructure (V2I) communications, vehicle-to-vehicle (V2V) communications, and/or vehicle-to-pedestrian (V2P) communications, which may be generically labeled as V2X communications, whereby the third-location of the host-vehicle 12 is determined relative to GPS coordinates received via V2X, as will be recognized by those in the art.

At the time of this writing, high-accuracy GPS systems (e.g. +/−0.1 m accuracy) are generally too expensive for use in cost sensitive automotive applications. So while cost effective means for the system 10 to determine the first location 52 using the camera 24 as the first-sensor 22 to a first accuracy 86 (e.g. +/−0.1 m), and determine the second location 54 using the radar-unit 26 to a second accuracy 88 (e.g. +/−0.1 m) are readily available, a cost effective means to determine the third location 84 using GPS may require the system 10 to accept or tolerate a third accuracy 90 (e.g. +/−0.5 m), which is characterized as less accurate than the first accuracy 86 and the second accuracy 88.

An alternative embodiment of the system 10 described above includes the first sensor 22, the second sensor 36, the digital-map 44, and the controller 46. However, instead of selecting which of the sensors 20 is used to determine the present-location 56 based on the first data-density 64 and the second data-density 66 of the digital-map 44, the controller 46 is alternatively configured to determine a first feature-density 92 of the navigation-features 42 detected by the first sensor 22 (e.g. how many instances of the first navigation-feature 42A), determine a second feature-density 94 of the navigation-features 42 detected by the second sensor 36 (e.g. how many instances of the second navigation-feature 42B), and select one of the first location 52 and the second location 54 for use to navigate the host-vehicle 12 based on a comparison of the first feature-density 92 and the second feature-density 94. That is, instead of relying on the density of map-data, the system 10 relies on the density of detected navigation-features actually detected by the sensors 20. A comparison of the first feature-density 92 and the second feature-density 94 is used to determine which of the first data-group 48 and the second data-group 50 is used, or primarily used, to navigate the host-vehicle 12.

An advantage of this feature-density based embodiment over the data-density based embodiment is that the system 10 may be able to more readily adapt to special conditions that more greatly affect the ability/sensitivity of the first sensor 22 compared to the second sensor 36, or the reverse. For example, if the weather conditions are such that roads are covered with snow and/or ice, the camera 24 may not be able to readily detect the roadway-marking 62. In contrast, if traffic is especially heavy, i.e. the traffic-density is relatively high; the number of vehicles broadcasting radar signals may cause problems with detecting distance instances of the navigation-features 42 by the radar-unit 26.

Similar to the earlier embodiment, it follows that the host-vehicle 12 may be navigated in accordance with the first location 52 when the first feature-density 92 is greater than the second feature-density 94, and the host-vehicle 12 is operated in accordance with the second location 54 when the first feature-density 92 is not greater than the second feature-density 94. It also follows that the controller 46 may be further configured to determine the average-location 80 based on the first location 52 and the second location 54, and navigate the host-vehicle 12 in accordance with the average-location when the first feature-density 92 and the second feature-density 94 are both less than a feature-density-threshold 96 because, for example, the host-vehicle 12 is traveling in a rural environment.

Accordingly, a navigation system (the system 10), a controller 46 and a digital-map 44 for the system 10, and a method of operating the system 10 is provided. The system 10 is generally configured to primarily use one of multiple sensors to navigate the host-vehicle 12 if there are a sufficient number of navigation-features 42 to do so. By thoughtfully selecting one of multiple sensors it is expected that the operation of the host-vehicle 12 will be steadier/smoother and therefore provide for a better travel experience for an occupant of the host-vehicle 12.

While this invention has been described in terms of the preferred embodiments thereof, it is not intended to be so limited, but rather only to the extent set forth in the claims that follow.

We claim:

1. A navigation system suitable for use by an automated vehicle, said system comprising:
    a first sensor used to determine a first relative-position of a first navigation-feature relative to a host-vehicle, said first sensor characterized as based on a first sensor-technology;
    a second sensor used to determine a second relative-position of a second navigation-feature relative to the host-vehicle, said second sensor characterized as based on a second sensor-technology different from the first sensor-technology;
    a digital-map that includes a first data-group composed of navigation-features characterized as preferentially detected by the first sensor-technology, and a second data-group composed of navigation-features characterized as preferentially detected by the second sensor-technology; and
    a controller in communication with the first sensor, the second sensor, and the digital-map, said controller configured to
    determine a first location of the host-vehicle on the digital-map based on the first relative-position of the first navigation-feature indicated by the first sensor, wherein the first data-group of the digital-map proximate to the first location is characterized by a first data-density,
    determine a second location of the host-vehicle on the digital-map based on the second relative-position of the second navigation-feature indicated by the second sensor, wherein the second data-group on the digital-map proximate to the second location is characterized by a second data-density, and
    select one of the first location and the second location for use to navigate the host-vehicle based on a comparison of the first data-density and the second data-density.

2. The system in accordance with claim 1, wherein the first sensor and the second sensor are each one of a camera, a radar-unit, and a lidar-unit, and the first sensor is different from the second sensor.

3. The system in accordance with claim 1, wherein the first navigation-feature is associated with a first object and the second navigation-feature is associated with a second object different from the first object.

4. The system in accordance with claim 1, wherein the first navigation-feature and the second navigation-feature are associated with a same object.

5. The system in accordance with claim 1, wherein the host-vehicle is navigated in accordance with the first location when the first data-density is greater than the second data-density, and the host-vehicle is operated in accordance with the second location when the first data-density is not greater than the second data-density.

6. The system in accordance with claim 1, wherein the controller is further configured to determine an average-location based on the first location and the second location, and navigate the host-vehicle in accordance with the average-location when the first data-density and the second data-density are both less than a data-threshold.

7. The system in accordance with claim 1, wherein the system includes a location-device used to determine a third location of the host-vehicle on the digital-map.

\* \* \* \* \*